Feb. 1, 1966 — L. J. ZIEGELMEYER — 3,232,172
HYDRAULIC MOTOR AND CONTROL UNIT
Filed Sept. 3, 1963 — 3 Sheets-Sheet 1
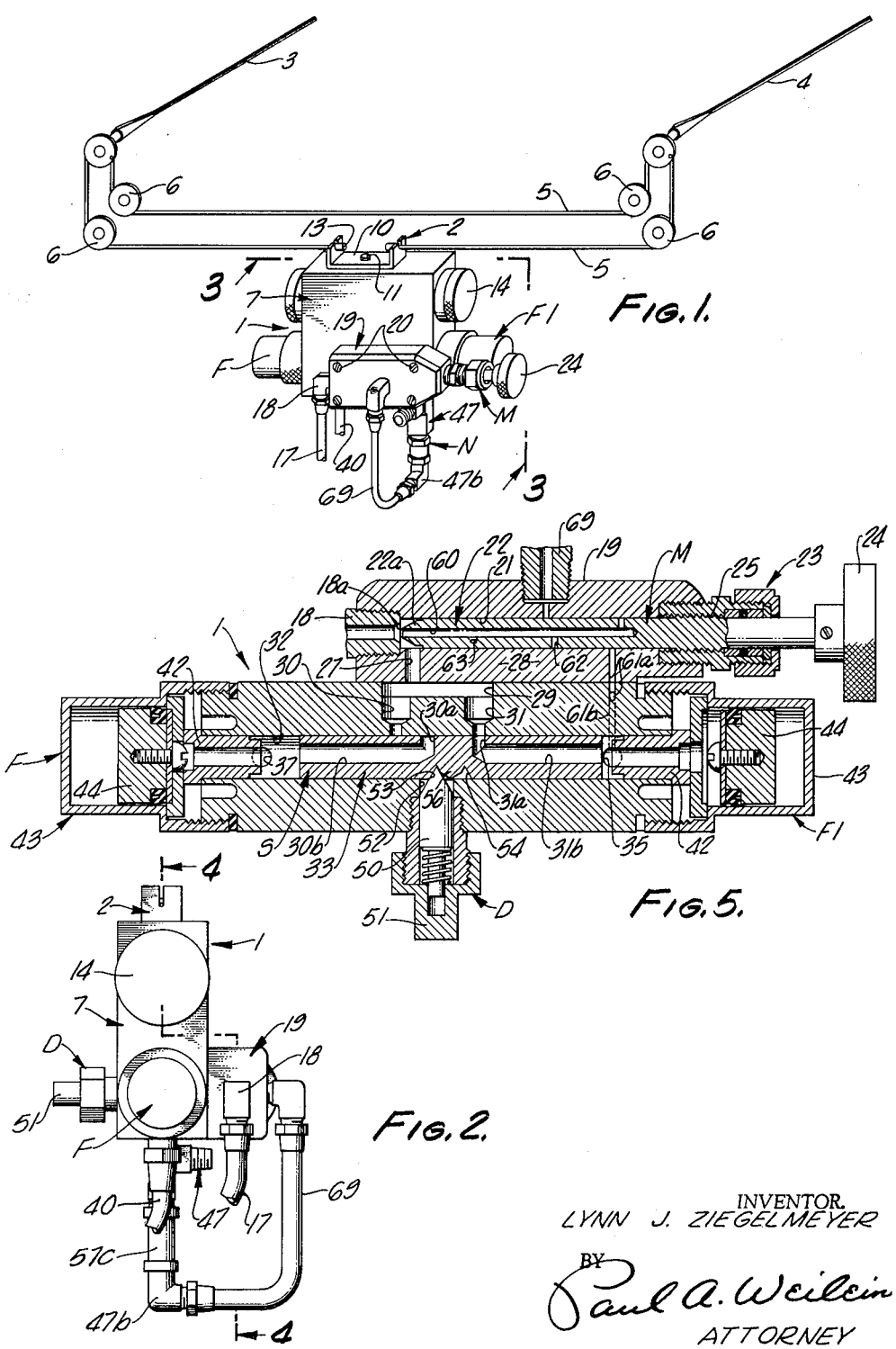
INVENTOR.
LYNN J. ZIEGELMEYER
BY Paul A. Weilein
ATTORNEY

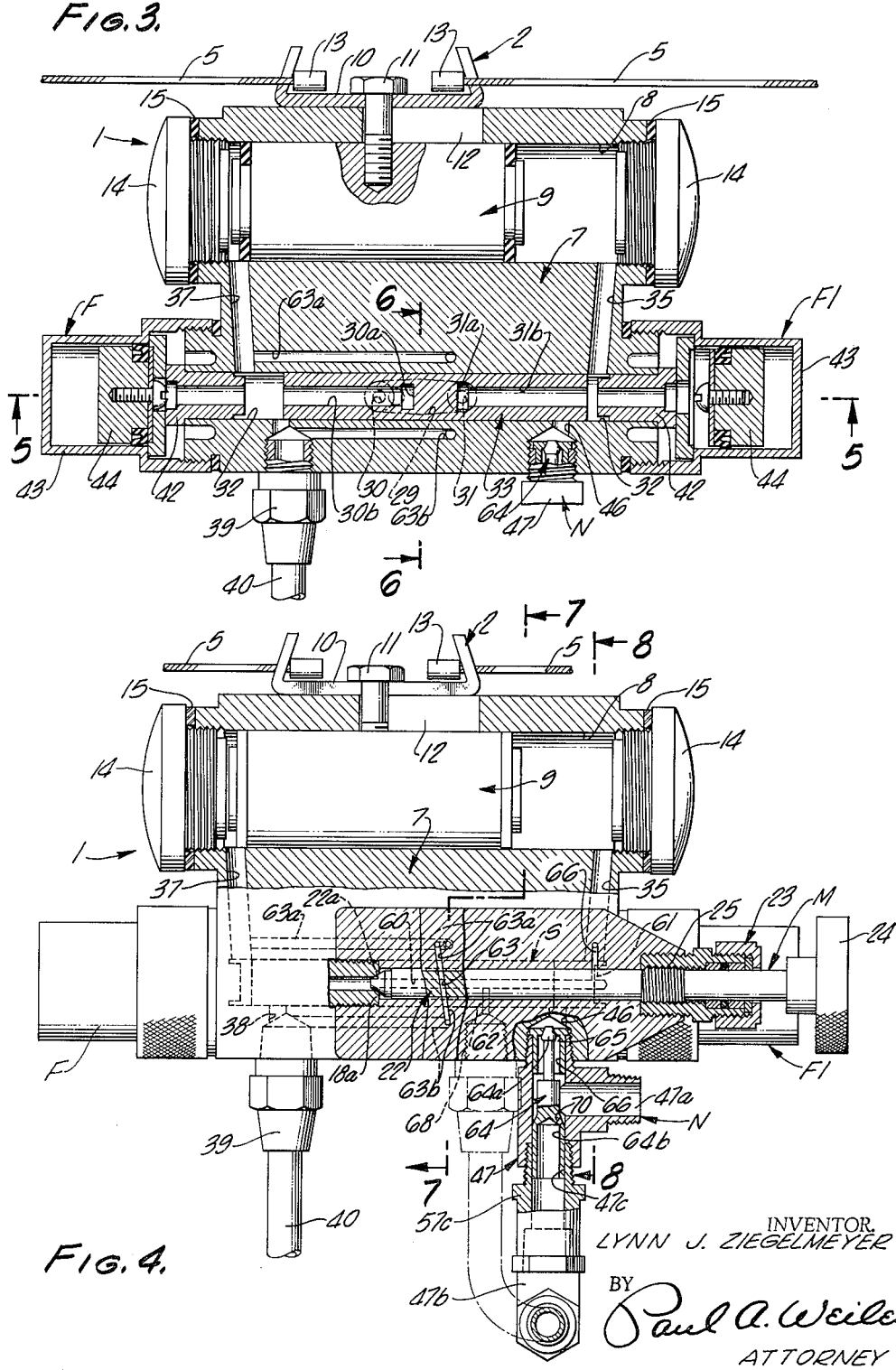

Feb. 1, 1966    L. J. ZIEGELMEYER    3,232,172
HYDRAULIC MOTOR AND CONTROL UNIT
Filed Sept. 3, 1963    3 Sheets-Sheet 3

INVENTOR.
LYNN J. ZIEGELMEYER
BY Paul A. Weilein
ATTORNEY

United States Patent Office 3,232,172
Patented Feb. 1, 1966

3,232,172
HYDRAULIC MOTOR AND CONTROL UNIT
Lynn J. Ziegelmeyer, P.O. Box 1076,
Klamath Falls, Oreg.
Filed Sept. 3, 1963, Ser. No. 306,047
5 Claims. (Cl. 91—7)

This invention relates to an improved hydraulic motor and control unit of the type forming the subject matter of my U.S. Letters Patent No. 2,864,342, issued December 16, 1958, and which is especially adapted for operating windshield wipers.

The present invention provides a novel, compact and efficient motor and control unit of simple construction and which, as in my aforementioned patent, includes an hydraulically operated reciprocable motor wherein a single flow reversing shuttle valve is actuated by hydraulic pressure and novel pressure actuated force applying means, to cyclically reciprocate the motor and windshield wiper actuated by the motor.

The fluid pressure for shifting the flow reversing valve is produced when the reciprocable motor completes a stroke. Also, in the event the motor is unable to complete a stroke due to the windshield wipers being obstructed by snow or ice, the motor and windshield wipers will continue to operate with a shortened stroke. The development of this hydraulic valve actuating pressure is achieved by means of the combined action of hydraulic pressure and compressed air, the latter being produced by the force applying means arranged so that air therein will be compressed responsive to the hydraulic pressure being applied to the motor. The force of this compressed air will be effective to increase the pressure of the hydraulic fluid to which the shuttle valve is exposed so that the valve will be shifted for reversing flow of hydraulic fluid to the motor, each time the motor completes a full stroke, or a shortened stroke, if the wipers are obstructed as aforesaid.

It is an object of the present invention to provide a hydraulic motor and control unit which constitutes an improvement over the motor and control means shown in my aforementioned patent, in having embodied therein novel and efficient means of simple construction and arrangement for operating the motor to return the windshield wiper or wipers, as the case may be, to a neutral or out-of-the-way position incident to stopping the normal reciprocating operation of the motor.

It is another object of this invention to provide in a motor unit such as described a novel manually operable combined shut-off and by-pass valve which, when in position to shut off normal flow of hydraulic pressure that is applied through the shuttle valve to the motor, will by-pass the hydraulic pressure to effect one operation of the motor required to move the windshield wipers to out-of-the-way or neutral position, the opening of the shut-off valve rendering the shuttle valve operative to control flow for normal reciprocation of the motor.

Further, it is an object of this invention to provide in a motor unit such as described a return-to-neutral valve means of simple form and which in cooperation with the manually operable shut-off and by-pass valve will cause fluid pressures by-passed when the shut-off valve is seated, to be directed to the motor for the one operation of the motor required to return the wipers to out-of-the-way position.

An additional object of this invention is to provide in a hydraulic motor unit of the character described improved force applying means for developing compressed air incident to the motor making a full stroke or a shortened stroke caused by obstruction of the wipers, whereby the force of the compressed air becomes effective in cooperation with the hydraulic pressure to shift the shuttle valve. The advantage of this improved type force applying means is that the hydraulic fluid does not come in contact with the air in the air chambers of the force applying units due to the use of pistons or the like in these units for applying compressing pressure to the air. Accordingly, loss of air by absorption in the hydraulic fluid is positively prevented, thereby assuring that sufficient air will be present at all times for a reliable operation of the motor.

Other objects and advantages of the invention will be hereinafter described or will become apparent to those skilled in the art, and the novel features of the invention will be defined in the appended claims.

Referring to the drawings:

FIG. 1 is a perspective view of a hydraulic motor and control means therefor embodying the present invention, schematically showing use thereof for operating windshield wipers;

FIG. 2 is a side elevation of the motor and control unit as seen from the left side of FIG. 1;

FIG. 3 is a vertical sectional view taken substantially on the line 3—3 of FIG. 1;

FIG. 4 is a vertical sectional view taken substantially on the line 4—4 of FIG. 2, with parts broken away and other parts schematically arranged, for the sake of clarity of illustration, the schematic showing being the conduit and associated elements that are shown in heavy dot-dash lines in the lower portion of the figure between the conduits shown in full lines;

FIG. 5 is a sectional view taken substantially on the line 5—5 of FIG. 3;

Figure 7:
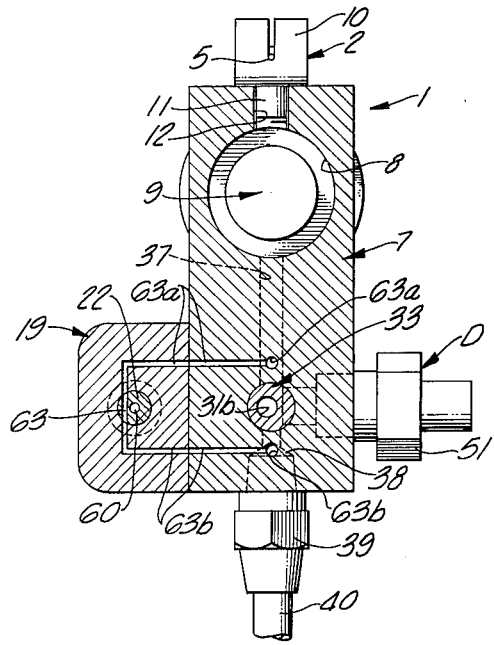
FIG. 7 is a sectional view taken on the line 7—7 of FIG. 4.

An illustrative embodiment of the present invention includes as shown in FIG. 1, a reciprocable hydraulic motor unit 1 having an oscillatory power take-off element 2, which may be employed as here schematically shown for operating a windshield wiper including a pair of wipers 3 and 4. In this use of the motor unit 1 the take-off element 2 may be connected ot a flexible belt 5 which leads through pulleys 6 to the wipers 3 and 4 whereby both wipers will be actuated in response to operation of the motor unit 1.

The motor unit 1 as here shown includes a block-like rectangular body 7 in which is provided a motor cylinder 8 containing a reciprocable piston 9. The oscillatory take-off element 2 comprises a U-shaped member 10 slidable on the cylinder 8 and connected to the piston 9 by means of a fastening 11 slidable in a slot 12 in the cylinder, the belt 5 being connected at its ends as at 13 to the member 10. The cylinder 8 may be closed at its ends by means of the closures 14 threadedly mounted in the ends of the cylinder and provided with suitable sealing rings 15.

The body 7 is also provided with fluid pressure operated shuttle valve means S for controlling the flow of hydraulic fluid under pressure to the cylinder 8. Also carried by the body 7 are manually operable on-off valve means M and return-to-neutral or by-pass valve means N, which latter causes movement of the piston 9 to dispose the wipers 3 and 4 to a neutral or down position, for example the position shown in FIG. 1, when the manually operable valve means M is turned to shut off flow to the shuttle valve means S. This return-to-neutral operation of valve means N will take place regardless of the position of the shuttle valve means S at the time the manually operable valve means M is moved to shut off flow of hydraulic fluid under pressure to the shuttle valve means.

The motor unit 1, the power take-off means and the shuttle valve means S, as here shown, are substantially the same in construction as the motor and control valve assembly shown in my U.S. Letters Patent No. 2,864,342 hereinbefore mentioned.

The present embodiment of this invention differs from that shown in the above noted patent, in providing improved compressed air actuating means for shifting the shuttle valve means S, the on-off manually operable valve means M and the return-to-neutral or by-pass valve means N. The construction and arrangement of the valve means M and N are such that the wiper elements 3 and 4 will return to a neutral or "down" position when valve means M shuts off hydraulic fluid to the shuttle valve means S, regardless of the position of the latter when this shut-off occurs.

In the present embodiment of this invention hydraulic fluid under pressure from a suitable source, not shown, passes through a conduit 17 coupled to a tubular inlet fitting 18 connected to a block-like housing 19 secured by means of fastenings 20 to the body 7. This housing contains the manually operable valve means M and is provided with a cylindrical bore 21 in which an elongate on-off valve member 22 is movable axially toward and away from a conical valve seat 18a in the inlet fitting 18. The valve member 22 extends through a stuffing box unit 23 screwed into the end of the bore 21 opposite the end in which the inlet fitting 18 is mounted, there being a knurled handle 24 on the outer end of the valve member for turning the valve member. Complementary screw threads 25 on the valve member 22 and the stuffing box unit 23 provide for axial movement of the valve member when the latter is rotated.

When the tapered end 22a of the valve member 22 is unseated as shown in FIG. 5, fluid under pressure will flow through the tubular intake fitting 18 into the bore 21, thence through a port 27 in the wall 28 of the housing 19 and into a chamber 29 in the body 7. This chamber 29 is provided at opposite ends with ports 30 and 31 leading into a shuttle valve chamber 32 providing a cylindrical bore in the body 7 for the shuttle valve means S.

Mounted to reciprocate in the bore of the shuttle valve chamber 32 in the manner of a piston is an elongate shuttle valve 33 having ports 30a and 31a opening on one side thereof for registration with the ports 30 and 31 according to the position of the valve. Extending from the ports 30a and 31a and leading axially through the valve 33 to opposite ends thereof are passages 30b and 31b. When valve 32 is shifted to the right to the position shown in FIGS. 3 and 5, the port 31a registers with port 31 and hydraulic fluid under pressure then becomes effective through conduit 17, fitting 18, bore 21, port 27, chamber 29, ports 31 and 31a, passage 31b, right end of valve chamber 32 and passage 35 leading into the right end of the motor cylinder 8, thereby moving the piston 9 to the left end of the cylinder 8.

Hydraulic fluid between the motor piston 9 and the left end of the motor cylinder 8 is returned through a passage 37 leading from the left end of the cylinder 8, to the left end of the shuttle valve chamber 32, thence through a port 38 into a fitting 39 and a return conduit 40 leading to a reservoir, not shown, at the source of pressure, also not shown.

At opposite ends of the shuttle valve chamber 32 are force applying units F and F1, which in response to hydraulic pressure thereagainst when the motor piston 9 reaches the ends of its stroke, will cause the shuttle valve 33 to be shifted to reverse the flow of hydraulic fluid and thus reverse the motor. These force applying units F and F1 also become operative should the windshield wipers become obstructed at any point short of completing their strokes, as would be occasioned by accumulations of ice or snow on the windshield, and the wipers will therefore continue to oscillate with shortened strokes until the obstruction is removed or the motor 1 shut off. As the force applying units F and F1 are identical, the description of one will suffice. Accordingly, it should be noted with reference to the unit F1 that when the motor piston 9 is moved to the left, fluid pressure is effective through a tubular member 42 plugged into the left end of the valve chamber 32 as well as effective in an air containing cylinder 43 of the unit F1, screwed onto a body 7. In the air cylinder 43 is a piston 44 which is moved in response to the pressure of the fluid thereagainst so as to compress air trapped between the piston 44 and the closed end of the cylinder. The hydraulic pressure against the piston 44 increases when the motor piston 9 reaches the end of its stroke or when the wipers 3 and 4 meet an obstruction on the windshield, resisting movement of the wiper and motor piston, thereby further compressing the air in the cylinder 43 and creating a force such that the resultant hydraulic fluid pressure against the shuttle valve 33 causes it to shift to the left for reversing the flow to the motor cylinder 8 and reversing the motor. When this takes place, hydraulic fluid under pressure becomes effective through ports 30 and 30a, passage 30b in the shuttle valve 33, left end of chamber 32, and passage 37 leading into the left end of the motor cylinder, thereby moving the piston 9 to the right.

Return fluid from the right end of cylinder flows through the passage 35 into the right end of the shuttle valve chamber 32 thence through a port 46 adjacent the right end of the chamber 32 into fitting 47 to which a return line, not shown, may be connected. The fitting 47, as will be hereinafter described, is a part of the return-to-neutral valve means N hereinbefore referred to.

It should be noted that in having pistons 44 in the two force applying units F and F1, the air trapped in the cylinder 43 does not come in contact with the hydraulic fluid and therefore is prevented from being absorbed in the hydraulic fluid.

When the motor piston 9 reaches the end of its stroke or is stopped short of reaching the end of its stroke by an obstruction on the windshield preventing completion of the stroke of the wipers 3 and 4, the force applying unit F at the left end of the shuttle valve chamber 32 operates in the same manner as described in connection with the unit F1 to shift the shuttle valve 33 and reverse the hydraulic motor.

The shuttle valve 33 is at all times in one of the other of its extreme positions and so releasably held by detent means D including, as shown in FIG. 5, a spring loaded detent member 50 slidable in a housing 51 and through an opening 52 in the body 7 so as to engage notches 53 and 54 in the shuttle valve 33. The detent member 50 has a beveled end 55 and the notches 53 and 54 are V-shaped with a V-shaped beveled portion or land 56 therebetween. This construction assures that the detent will yield under the pressure applied to the valve 33 to shift the valve and also assures that the valve will be releasably held in predetermined positions and operated without turning about its axis, it being noted that the detent and valve have surfaces in contact with one another at all times and which are flat and squarely engaged to restrain turning of the valve about its axis.

The return to the neutral or by-pass means N become operative incident to the closing of the manually operable valve 22 regardless of the position of the shuttle valve 33. Accordingly, when the manually operable valve 22 is engaged with its seat 18a (see FIG. 4) the application of hydraulic pressure to the port 27, chamber 29 and shuttle valve 33 is shut off, but is effective in a by-pass passage 60 extending axially from the tapered end 22a of the valve 22 partway along the latter. By-pass ports and passages to be hereinafter described are arranged as will also be described, to control the flow of hydraulic fluid in such a manner that fluid under pressure from the by-pass passage 60 will be directed to the right end of the motor cylinder 8 so that if the windshield wipers 3 and 4 are in any position other than the neutral or down position shown in FIG. 1, when the valve 22 is seated, the motor piston 9 will be moved to the left to return the wipers to the neutral or down position.

If the wipers 3 and 4 are in the neutral or down position when the manual shut-off valve 22 is seated, the by-pass pressure directed to the motor cylinder 8 will merely hold the piston 9 in the left end of the cylinder. The by-pass pressure will continue to be present but without effect in the by-pass ports and passages and right end of the cylinder 8 until the hydraulic pressure is shut off at the source, in other words, until the source pressure pump is shut off. This continuation of by-pass pressure will not be effective to actuate the shuttle valve to move the piston 9 from the left end of the cylinder even if the power applying unit F1 has operated to shift the shuttle valve 33 to the left, because no pressure can be effective in the left end of the shuttle valve chamber 32 as long as the manual valve 22 is seated as shown in FIG. 4.

As to the construction and arrangement of the by-pass ports and passages for conducting fluid under pressure as here provided to effect the aforementioned return of the wipers 3 and 4 to neutral position, it will be seen with reference to FIG. 5 that when the valve 22 is unseated pressure ports 61 and 62 axially spaced thereon and leading from the passage 60 therein to the exterior of the valve, are closed by imperforate portions of the wall of bore 21 in which valve 22 is mounted.

A return fluid port 63 extends transversely through the valve without intersecting the by-pass passage 60 and is also closed at its ends by imperforate portions of the wall of the bore 21 for the valve 22 when the latter is unseated. Thus, when the valve 22 is unseated, no effective flow of fluid takes place from the by-pass passage 60, and the valve 33 is subject to operation to actuate the motor unit 1 in the manner hereinbefore described.

When the manual valve 22 is seated as shown in FIG. 4, the pressure port 61 in this valve registers with a passage 61a leading through the housing wall 28 (see FIG. 5) into a passage 61b which extends through the body 7 into the passage 35 leading into the right end of the motor cylinder 8, thereby causing the motor piston 9 to move to the left so as to move the wipers 3 and 4 to the neutral or "down" position shown in FIG. 1. In order that the hydraulic fluid under pressure may be operative to move the piston to the left of the motor cylinder 8, it is necessary that the return port 46 at the right end of the shuttle valve chamber 32 be closed as shown in FIG. 4, as otherwise the pressure fluid in passage 35 which is in communication with this return port, would vent through the fitting 47 with the result that the motor piston 9 would not be shifted to return the wipers to neutral position. Accordingly, the return-to-neutral valve means N is operated by hydraulic pressure to close the port 46 when the manual valve 22 is seated and is operable to open the port 46 when the valve 22 is unseated. As shown in FIG. 4, the valve means N includes a needle valve 64 operable in the tubular fitting 47 so that a tapered end 64a thereof is movable into and from seated position with respect to a valve seat 65. This seat is provided in the upper end of a tubular member 66 mounted in the end portion of the tubular head of a T-shaped section 47a of the fitting 47 that is threaded into a tapped opening in the body 7 leading to the return port 46. An elbow section 47b is connected by a nipple 57c to the section 47a and slidably supports therein the enlarged hollow piston-like lower end 64b of the needle valve 64. The tubular shank 47d of the section 47 projects laterally and may be coupled to a fluid return conduit not shown.

Figure 8:
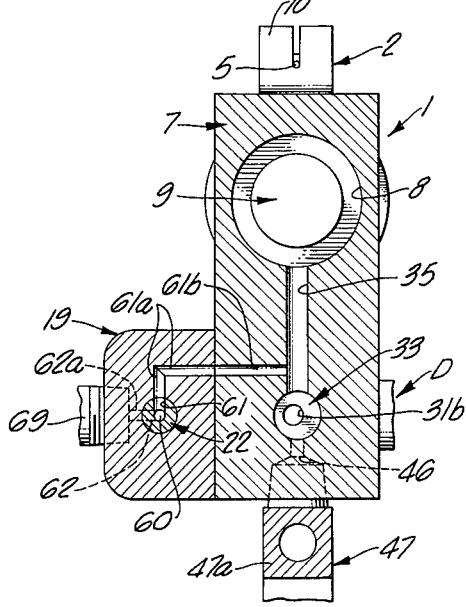
FIG. 8 is a sectional view taken substantially on the line 8—8 of FIG. 4.
Figure 6:
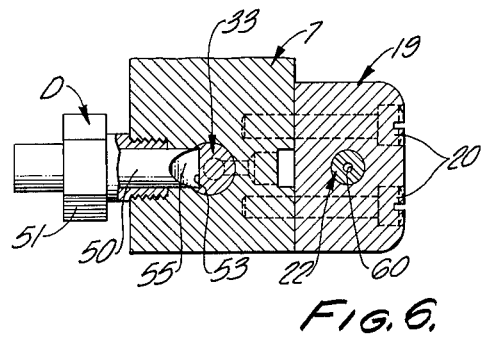
FIG. 6 is a fragmentary sectional view taken on the line 6—6 of FIG. 3.

When the manual valve 22 is seated, as shown in FIGS. 4 and 8, the pressure port 62 in valve 22 registers with a port 62a leading into tapped opening 68 in the housing 19. A pipe or conduit 69 is threadedly connected with the opening 68 at one end and with the elbow unit 47b at its other end. With reference to FIG. 4, the pipe 69, opening 68 and port 62a are schematically shown to the left of the position in which these parts are actually located, for the sake of illustrating the hydraulic circuitry in one view of the drawings. Pressure fluid entering pipe 69 passes into the lower part of the fitting 47 and is effective against the piston portion 64b of the needle valve 64 to move the latter upwardly against the seat 65. This seating of valve 64 will prevent pressure fluid entering the passage 35 for actuating the piston 9, from escaping through the return port 46 just above the valve seat 65.

During actuation of the piston 9 to return the wipers to neutral or down position, return fluid flows from the left end of cylinder 8, as shown in FIGS. 4 and 7, into the return passage 37, thence through passsge 63a leading therefrom to one end of the port 63 extending transversely through the valve 22. The other end of passage 63 registers with passage 63b leading into the return line 40.

The needle valve 64, after being seated, will so remain as long as the manual valve 22 is seated and the by-pass fluid continues to be delivered to the lower end of the needle valve. However, when the valve 22 is unseated, the turning thereof necessary to unseat it moves the ports 61, 62 and 63 in the valve into closed position out of registry with the associated by-passing ports and the hydraulic pressure is then ineffective in the by-pass passage 60 within the valve 22. A small bleed hole 70 in the piston portion 64b of the needle valve 64 permits fluid trapped below the needle valve to escape through the return line portion 47d of the fitting 47. This relief of fluid beneath valve 64 permits the valve to be unseated by pressure of return fluid reaching the return port 46 from the motor cylinder 8. The motor 1 may now be operated to oscillate in wipers 3 and 4 and will so continue while the valve 22 is unseated.

Figure 9:
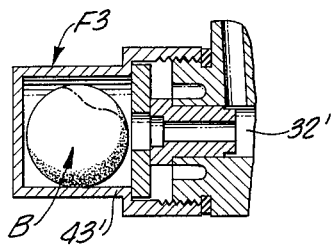
FIG. 9 is a fragmentary sectional view of a modified form of one of the pressure responsive actuating elements of this invention.

A modified form of force applying means F3 as shown in FIG. 9, may be used in place of the means F and F1, and includes a housing or cylinder structure 43' open at one end to communicate with the shuttle valve chamber 32' and closed at its other end. In the cylinder 43' is a compressible hollow ball B like a tennis ball, made of synthetic rubber or other suitable material and which in response to pressure of the hydraulic fluid thereagainst will partially collapse and compress the air interiorly thereof so as to develop a force effective by the exterior surface of the ball B on the hydraulic fluid for shifting the shuttle valve 32 in the same manner as described in connection with the unit F and F1 shown in FIGS. 1–8.

While specific structural details have been shown and described, it should be understood that changes and alterations may be resorted to without departing from the spirit of the invention as defined in the appended claims.

I claim:

1. In a hydraulic motor: a cylinder having a piston reciprocable therein and ports adjacent opposite ends thereof; power take-off means connected to said piston; a valve chamber; means providing a pair of passages connecting said valve chamber with said ports; said valve chamber having an inlet port and a pair of return ports for connection with a source of hydraulic fluid under pressure; a valve member movable in said valve chamber in response to hydraulic pressure; said valve member having ports cooperable with said inlet and return ports for reversing hydraulic pressure through said pair of passages to said cylinder; manually operable valve means for connecting said inlet port with said source operable to open and close said inlet port; and by-pass means including by-pass passages and by-pass ports controlled by said manually operable valve; said by-pass means also including a fluid pressure operated by-pass valve; said by-pass passages leading to said pair of passages to direct pressure fluid to said cylinder for moving said piston in one direction into a predetermined position only when said manually operable valve means closes said inlet port; said by-pass passages directing fluid to said by-pass valve for operating the latter to close one of said return ports in response to said closing of said inlet port.

2. In a hydraulic motor: a cylinder having a piston reciprocable therein and ports adjacent opposite ends thereof; power takeoff means connected to said piston; a valve chamber; a pair of passages connecting said valve chamber with said ports; said valve chamber having an inlet port and return ports for connection with a source of hydraulic fluid under pressure; a valve member movable in said valve chamber in response to hydraulic pressure; said valve member having ports cooperable with said inlet and return ports for reversing hydraulic pressure through said pair of passages leading to said cylinder; a manually operable valve operable to open and close said inlet port; said manually operable valve having by-pass ports therein which are opened to passage of fluid therethrough only when said manually operable valve closes said inlet port; and means providing by-pass passages leading from said manually operable valve to said pair of passages leading to said cylinder and including a fluid pressure operated by-pass valve for closing one of said return ports; said by-pass ports registering with said by-pass passages and directing fluid for operating said by-pass valve when said manually operable valve means closes said inlet port.

3. In a hydraulic motor: a cylinder having a piston reciprocable therein and ports adjacent opposite ends thereof; power take-off means connected to said piston; a shuttle valve chamber; means providing a pair of passages connecting said shuttle valve chamber with said ports; said shuttle valve chamber having an inlet port and a pair of return ports for connection with a source of hydraulic fluid under pressure; a shuttle valve member movable in said shuttle valve chamber in response to hydraulic pressure; said shuttle valve member having ports cooperable with said inlet and return ports for reversing the application of hydraulic pressure through said passages to said cylinder; means in communication with said shuttle valve chamber operable in response to hydraulic pressure when said piston while under hydraulic pressure is restrained, for creating a force effective through the hydraulic fluid to move said shuttle valve member for reversing pressure through said passages to said cylinder; manually operable valve means adapted to be connected with said source operable to open and close said inlet port relative to said shuttle valve chamber; by-pass valve means connected to said shuttle valve chamber and operable in response to hydraulic pressure to close one of said return ports; and a by-pass passage in said manually operable valve means for receiving fluid from said inlet port when said manually operable valve means closes said inlet port relative to said shuttle valve chamber; said manually operable valve means having a first port means for establishing communication between one of said passages of said pair and one of said return ports when said manually operable valve closes said inlet port relative to said shuttle valve chamber; said manually operable valve having a second port means and a third port means both leading into said by-pass passage from the exterior of said manually operable valve; said second port means operating to direct fluid pressure to the other of said passages of said pair and into said cylinder for moving said piston to a predetermined position upon said closing of said inlet port; and said third port means operating upon said closing of said inlet port to direct fluid pressure for operating said by-pass valve means to close the other of said return ports.

4. In a hydraulic motor: a cylinder having a piston reciprocable therein and ports adjacent opposite ends thereof; power take-off means connected to said piston; a valve chamber; means providing a pair of passages connecting said valve chamber with said ports; said valve chamber having an inlet port and a pair of return ports for connection with a source of hydraulic fluid under pressure; a valve member movable in said valve chamber in response to hydraulic pressure; said valve member having ports cooperable with said inlet and return ports for reversing hydraulic pressure through said pair of passages to said cylinder; manually operable valve means for connecting said inlet port with said source operable to open and close said inlet port; and by-pass means including a fluid pressure responsive by-pass valve for controlling one of said return ports, and means providing by-pass ports in and passages leading from said manually operable valve to said by-pass valve and to the other of said return ports as well as to said passages connecting said chamber with said ports in said cylinder; said by-pass means being operable on the closing of said inlet port to direct pressure fluid through said by-pass passages for moving said piston to a predetermined position and for operating said by-pass valve to close said one by-pass port.

5. In a hydraulic motor: a cylinder having a piston reciprocable therein and ports adjacent opposite ends thereof; power take-off means connected to said piston; a valve chamber; means providing a pair of passages connecting said valve chamber with said ports; said valve chamber having an inlet port and a pair of return ports for connection with a source of hydraulic fluid under pressure; a valve member movable in said valve chamber in response to hydraulic pressure; said valve member having ports cooperable with said inlet and return ports for reversing hydraulic pressure through said pair of passages to said cylinder; manually operable valve means for connecting said inlet port with said source operable to open and close said inlet port; by-pass means including a fluid pressure responsive by-pass valve for controlling one of said return ports, and means providing by-pass ports in and passages leading from said manually operable valve to said by-pass valve and to the other of said return ports as well as to said passages connecting said chamber with said ports in said cylinder; said by-pass means being operable on the closing of said inlet port to direct pressure fluid through said by-pass passages for moving said piston to a predetermined position and for operating said by-pass valve to close said one by-pass port; and means embodied in said by-pass valve whereby said by-pass valve will open said one return port in response to return fluid from said cylinder when said inlet port is opened.

References Cited by the Examiner
UNITED STATES PATENTS

| 2,163,982 | 6/1939 | Merceir | 92—134 |
| 2,302,232 | 11/1942 | MacNeil | 91—347 |
| 2,450,564 | 10/1948 | Sacchini | 91—7 |
| 2,869,165 | 1/1959 | Dermond | 91—283 |
| 2,878,788 | 3/1959 | Wysong | 91—318 |
| 3,005,445 | 10/1961 | Reister | 91—7 |

FOREIGN PATENTS 992,359 7/1951 France.

SAMUEL LEVINE, *Primary Examiner.*

FRED E. ENGELTHALER, *Examiner.*

P. T. COBRIN, *Assistant Examiner.*